United States Patent
Choi

(10) Patent No.: US 6,268,886 B1
(45) Date of Patent: *Jul. 31, 2001

(54) APPARATUS FOR CONVERTING PICTURE FORMAT IN DIGITAL TV AND METHOD OF THE SAME

(75) Inventor: Seung Jong Choi, Seoul (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,612

(22) Filed: Nov. 12, 1998

(30) Foreign Application Priority Data

Nov. 12, 1997 (KR) .................................. 97-59507

(51) Int. Cl.⁷ ...................................................... H04N 2/01
(52) U.S. Cl. .......................................... 348/448; 348/452
(58) Field of Search .................................... 348/448, 452, 348/416, 409, 441

(56) References Cited

U.S. PATENT DOCUMENTS

| 5,347,314 | 9/1994 | Faroudja et al. | 348/448 |
| 5,610,661 * | 3/1997 | Bhatt | 348/448 |
| 5,689,305 * | 11/1997 | Ng et al. | 348/448 |
| 5,784,114 * | 7/1998 | Borer et al. | 348/452 |
| 5,825,429 * | 10/1998 | Shirahata | 348/452 |
| 5,883,671 * | 3/1999 | Keng et al. | 348/448 |
| 5,943,099 * | 8/1999 | Kim | 348/448 |

* cited by examiner

Primary Examiner—Victor R. Kostak
(74) Attorney, Agent, or Firm—Fleshner & Kim, LLP

(57) ABSTRACT

An apparatus and method for converting a picture format in a digital TV is disclosed including a picture characteristic extracting section analyzing a compressed bit stream of every input picture scanned in an interlaced scanning pattern to analyze the characteristic of each picture; an interpolation determining section determining an interpolation operation processing in an adaptable manner using information each extracted from every given pictures at the picture characteristic extracting section; and an operation performing section performing the related operation according to the interpolation operation processing determined by the interpolation determining section to perform an interpolation.

21 Claims, 8 Drawing Sheets

EVEN FIELD          ODD FIELD

I-FRAME  B-FRAME  P-FRAME

I-FRAME  B-FRAME  P-FRAME

I-FRAME  B-FRAME  P-FRAME

APPARATUS FOR CONVERTING PICTURE FORMAT IN DIGITAL TV AND METHOD OF THE SAME

BACKGROUND OF THE INVENTION

1. Field of the Invention

The present invention relates to a digital TV and more particularly to an apparatus and method for converting a picture scanned in the interlaced scanning pattern to a picture scanned in the progressive scanning pattern.

2. Discussion of Related Art

Generally, a picture of a digital TV may be scanned on a monitor by an interlaced scanning pattern or a progressive scanning pattern. Some display monitors requires one type of scanning pattern while the picture is received in another type of scanning pattern. A deinterlacing apparatus is used to convert a picture scanned in the interlaced scanning pattern to a picture scanned in the progressive scanning pattern, filling the pixel value omitted in one field to provide a perfect frame.

For example, a deinterlacing apparatus is required to display TV signals on the monitor of a computer. Because the computer monitor supports the progressive scanning system and the TV signal such as NTSC supports the interlaced scanning system, the TV signal of the interlaced scanning system must be converted to signals in the progressive scanning system in order to view the picture on the computer monitor.

To fill the pixel values omitted in a field and complete one frame, the deinterlacing apparatus and method employs interpolation in the field, interpolation in the field or compensation between the fields through motion detection, or compensation between the fields using motion vectors through motion estimation. A deinterlacing apparatus and method employing interpolation in just the field is used for a very simple system.

FIGS. 1a through 1c are diagrams illustrating a grand-alliance deinterlacing procedure according to prior art, in which the grand-alliance deinterlacing procedure is adopted to perform interpolation in the field and compensation between the fields by way of motion detection. FIGS. 2a and 2b illustrate a deinterlacing procedure employing motion compensation according to the prior art, in which the deinterlacing procedure is adapted to perform compensation between the fields using motion vectors via motion estimation.

In the deinterlacing procedure employing motion detection recommended by the HDTV standards of the North American area, pixels A to H adjacent a pixel to be filled are determined as shown in FIG. 1b. The location of these pixels are used to calculate E1=|F−C|, E2=|(D+E)/2−(A+B)/2| and E3=|(D+E)/2−(G+H)/2|. The largest one of the values E1, E2 and E3 is set to $E_{max}$ for motion detection. The value of $E_{max}$ is then compared with thresholds T1 and T2 to determine the value of , as shown in FIG. 1c, in which  is the weight for interpolation in the field and 1−  is the weight for compensation between the fields. After determining the weights for interpolation in the field and compensation between fields, the value of the omitted pixel as shown in FIG. 1a is calculated as ((D+E)/2)* +C*(1− ) and other omitted pixels are also filled in a similar way.

The deinterlacing apparatus employing interpolation in both the field and compensation between the fields provides progressive pictures of high quality relative to a deinterlacing apparatus that performs interpolation in just the field.

However, it is difficult to determine the thresholds values T1 and T2 used to calculate the weights for interpolation in the field and compensation between the fields.

If the threshold T1 has an extremely small value, the interpolation in the field prevails over compensation between the fields and does not achieve a high quality picture. On the contrary, a too large threshold T2 makes the compensation between the fields prevail over the interpolation in the field. The heavy weight in the compensation between the fields may be better for a still picture, but performs interpolation with erroneous pixel values for a moving picture causing deterioration of picture quality.

FIGS. 2a and 2b shows a deinterlacing procedure using motion vectors to perform compensation between the fields via motion estimation. As shown, a motion estimating section 21 searches for motion of an input picture to determine the pixels most likely omitted from pixels A to L, and a deinterlacing section 22 fills the omitted pixels with pixels indicated by the motion vector.

However, a picture produced by a deinterlacing procedure using motion vectors has much errors in the motion estimation due to its poor vertical resolution. Also, the motion estimating procedure is extremely complex, requiring many calculations in the deinterlacing section 22, which raises the cost of filling the omitted pixels.

SUMMARY OF THE INVENTION

Accordingly, an object of the present invention is to solve at least the problems and disadvantages of the related art.

Particularly, an object of the present invention is to provide a picture format converting apparatus and method to achieve a high quality picture with minimal cost.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a picture format converting apparatus and method according to the present invention analyzes the information of each picture obtained by decoding a compressed input picture scanned in an interlaced scanning pattern and performs motion-adaptive interpolation of the picture in an adaptable manner according to the analysis result.

One embodiment of the present invention includes a picture characteristic extracting section for analyzing a compressed bit stream of every input pictures scanned in an interlaced scanning pattern to analyze the characteristic of each picture; an interpolation determining section for determining an interpolation operation processing in an adaptable manner using information extracted for every given pictures at the picture characteristic extracting section; and an operation performing section for performing the related operation according to the interpolation operation processing determined by the interpolation determining section to perform an interpolation.

The picture characteristic extracting section according to the present invention includes a decoding section for decoding the compressed bit stream of the input picture scanned in the interlaced scanning pattern to extract the individual characteristics of macro blocks of each frame and the entire characteristic of each frame; and a threshold determining section for determining thresholds by use of the characteristics extracted by the decoding section based on the type of the frame in order to employ compensation between fields or interpolation in the field properly.

In an another embodiment of the present invention, a method for converting a picture format in a digital TV includes the steps of analyzing a compressed bit stream of every input pictures scanned in an interlaced scanning pattern to analyze the characteristic of each picture; determining an interpolation operation processing in an adaptable manner using information each extracted for every given pictures; and performing the related operation according to the determined interpolation operation processing to perform an interpolation.

The step of analyzing the characteristic of the picture according to the present invention includes extracting the coding type of each macro block, right/counter directional motion vector, and the DCT coefficient of the original or differential picture; comparing the number of intra-coded blocks with the number of blocks coded through motion compensation; and extracting the degree of motion from the correlation between the size information of the motion vectors of each macro block and the motion vectors of the adjacent blocks.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Figure 1A:
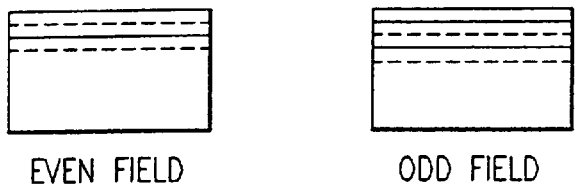
FIGS. 1a to 1c are diagrams illustrating a grand-alliance deinterlacing method according to the prior art.
Figure 1B:
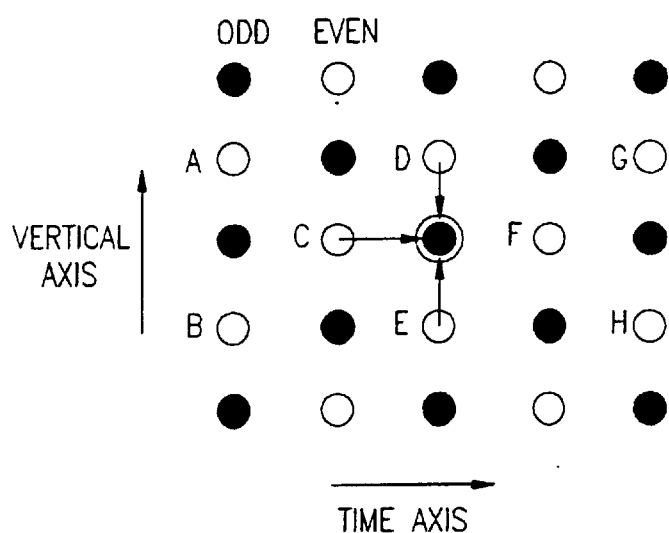
Figure 1C:
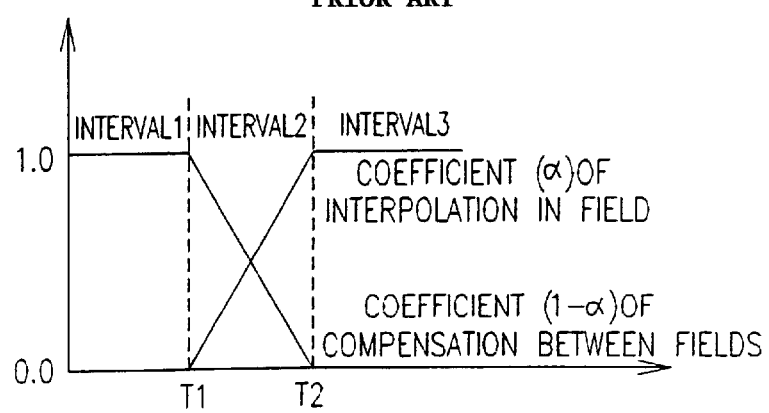
Figure 2A:
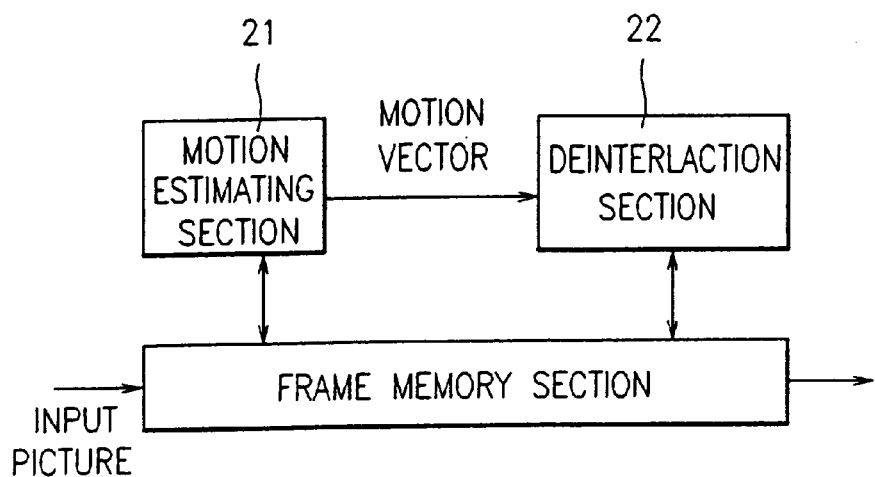
FIGS. 2a and 2b are diagrams illustrating a deinterlacing method using motion compensation according to the prior art.
Figure 2B:
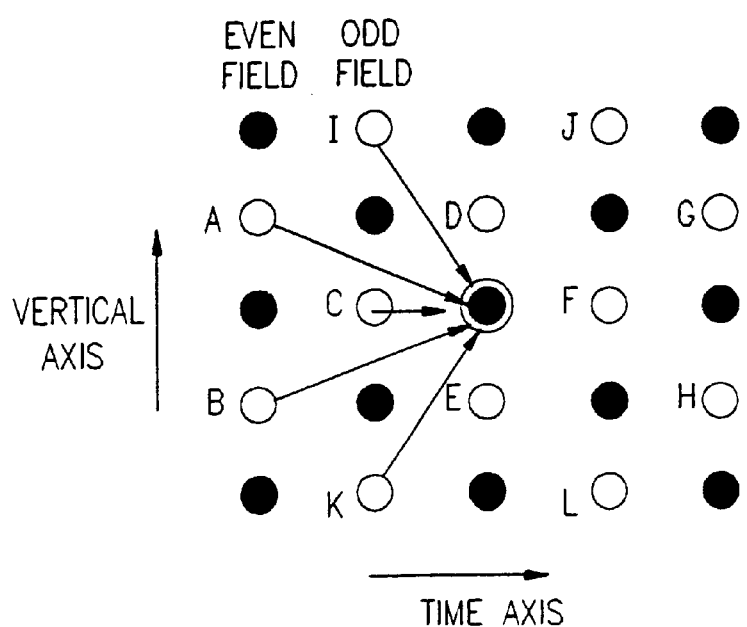
Figure 3:
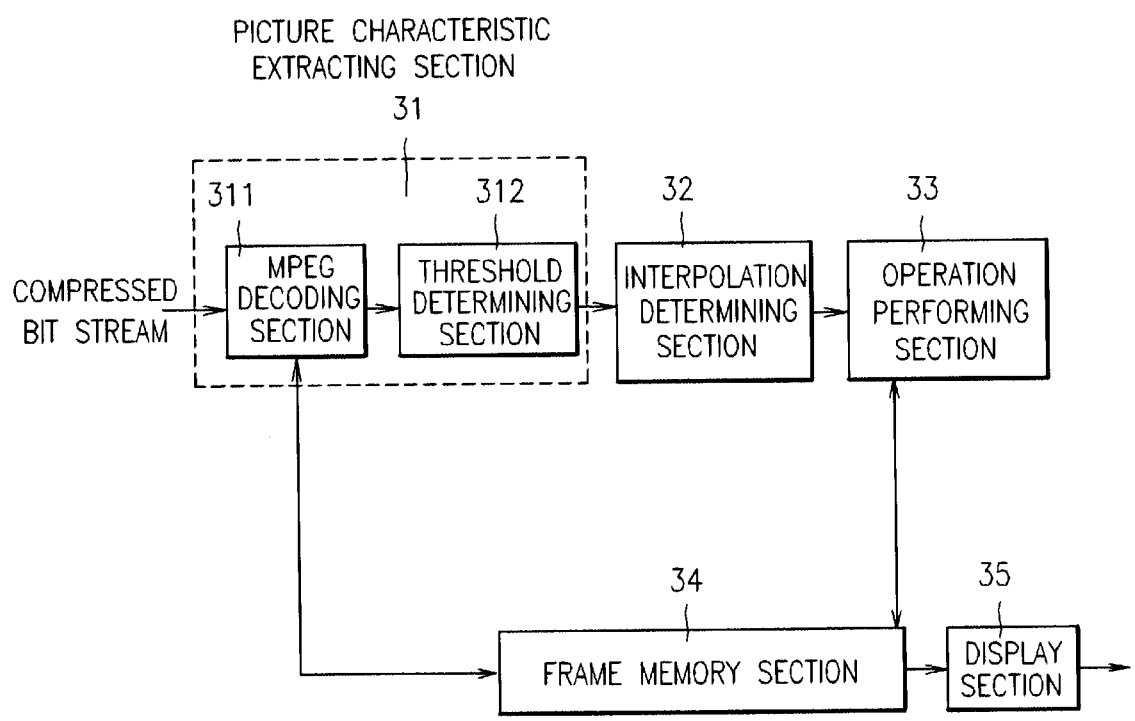
FIG. 3 is a block diagram illustrating the construction of a picture format converting apparatus in a digital TV according to the present invention.

FIG. 3 shows an embodiment of a picture format converting apparatus in a digital TV according to the present invention including a picture characteristic extracting section 31 analyzing an input compressed bit stream for each picture in order to analyze the characteristic of the picture; an interpolation determining section 32 determining the interpolating operations using information of the picture extracted at the picture characteristic extracting section 31; an operation performing section 33 performing the related operations for interpolation based on the weight determined at the interpolation determining section 32; a frame memory section 34 storing the pictures scanned in a progressive scanning pattern after interpolation at the operation performing section 33 to be output; and a display section 35 displaying the picture scanned in the progressive scanning pattern output from the frame memory section 34.

The picture characteristic extracting section 31 comprises an MPEG decoding section 311 decoding the compressed input bit stream of a picture scanned in an interlaced scanning pattern to extract the characteristic of each macro block frame of the respective frames and the entire characteristic of each frame; and a threshold determining section 312 determining thresholds using compensation between the fields and interpolation in the field based on the characteristics extracted at the MPEG decoding section 311 according to the type of the frame.

Figure 4:
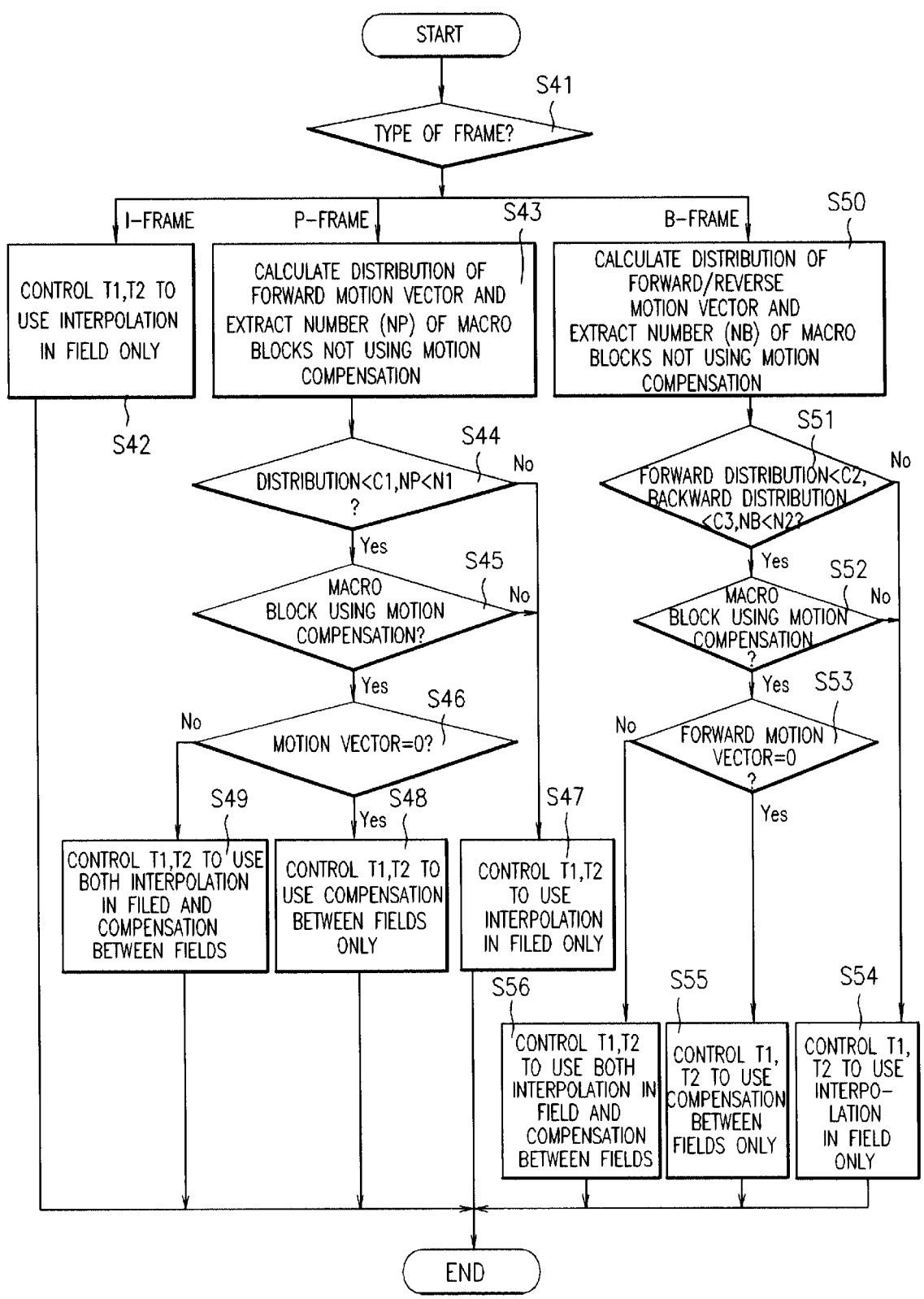
FIG. 4 is a flowchart illustrating a method of determining thresholds corresponding to an input picture using additional information according to the present invention.

FIG. 4 is a flowchart illustrating a method of determining thresholds corresponding to an input picture using additional information according to the present invention. FIGS. 5a to 5d are graphs illustrating examples of threshold control corresponding to the characteristics of each frame and macro block based on the type of the frame according to the present invention.

In the present invention, the MPEG decoder classifies a picture into an Intra (I) frame, a Predictive (P) frame or a Bidirectional (B) frame and decodes the picture based on the type of the frame. Each frame is divided into macro block units constituted by 16×16 pixels. Also a macro block coding type, a forward/reverse directional motion vector, a DCT coefficient of the original picture or differential picture, or the like is transferred to each frame. The motion vector and the DCT coefficient are determined upon the type of the frame and the type of the macro block coding.

The P and B frames are subjected to a motion compensation and transferred with the motion vector and the DCT coefficient of the motion-compensated differential signal in order to enhance the efficiency of the encoding process. However, motion compensation may not be employed in encoding the certain macro blocks of the P and B frames because of picture transition or other reasons. To indicate not to use motion compensation in the macro block coding process, the macro block coding type indicating how each macro block has been encoded is transferred to the head of each block.

As discussed above, the picture characteristic extracting section 31 performs an MPEG decoding of the compressed bit stream of a picture scanned in the interlaced scanning pattern, controlling the deinterlacing procedure by use of various additional information automatically obtained during the MPEG decoding process. More specifically, the MPEG decoding section 311 and the threshold determining section 312 divide the characteristic of the input picture into full frame-based characteristic and individual macro block-based characteristic.

For the full frame-based characteristic, the number of the intra-coded blocks is compared with the number of blocks coded using motion compensation. Next the correlation information between the size information of each macro block motion vectors to the motion vectors of the adjacent blocks is extracted to determine the motion information such as the transition or the entire motion of the picture.

If the inter-field motion or motion between the fields is excessively large or if the motions of the objects change greatly within a field, the interpolation in the field is given a greater weight than the compensation between the fields. However, for a motionless picture with minimal motion between the fields, the compensation between the fields is given more weight in the processing of the picture.

For each macro block unit, the weights for the interpolation in the field and the compensation between the fields are determined considering the correlation of the block coding type information to the size of the motion vector and the motion vectors of the adjacent blocks. Particularly in step S41 of FIG. 4, the picture characteristic extracting section 31 checks the type of the frame.

Figure 5A:
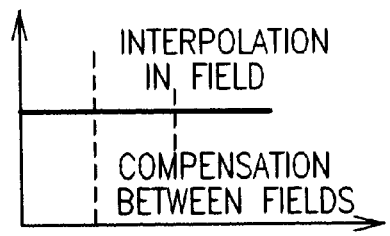
FIGS. 5a to 5d are graphs illustrating examples of threshold control corresponding to the characteristics of frame and macro block based on the type of the frame according to the present invention.

If the frame is an I frame, the thresholds T1 and T2 are determined to use only the interpolation in the field (step S42) as shown in FIG. 5a. If the frame is a P frame, the distribution of the forward directional motion vector is calculated and the number NP of the macro blocks not using motion compensation is extracted in order to extract the entire characteristic of the related frame. In step S44, a judgement is formed as to whether or not the calculated distribution is below a predetermined value C1 and the number NP of the macro blocks is below a predetermined value N1.

If the outcome of the judgement indicates that the calculated distribution is below the predetermined value C1 and the number NP of the macro blocks is not less than the value N1, thresholds T1 and T2 are controlled to use only the interpolation in the field (step S47) as shown in FIG. 5a. If the outcome of the judgement formed in step S44 indicates that the calculated distribution is below the predetermined value C1 and the number NP of the macro blocks is below the value N1, a judgement is formed as to whether or not the macro block is a macro block using motion compensation (step S45) in order to extract the characteristic of each macro block.

If the outcome of the judgement indicates that the macro block is not a macro block using motion compensation, the thresholds T1 and T2 are controlled to use only the interpolation in the field (step S47). If the macro block is a macro block using motion compensation, a judgement is formed as to whether or not the motion vector is 0 (step S46).

Figure 5B:
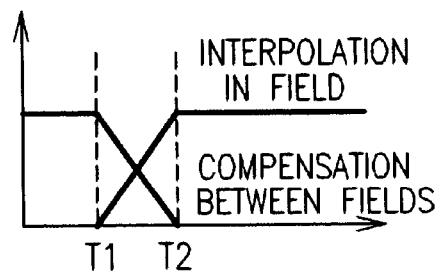
Figure 5C:
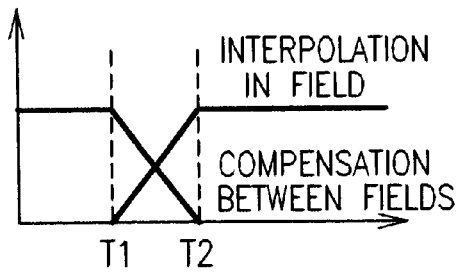
Figure 5D:
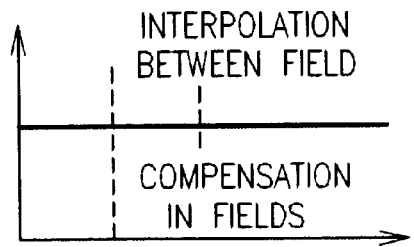

If the motion vector is 0, the thresholds T1 and T2 are controlled to employ only the compensation between the fields (step S48) as shown in FIG. 5d. Otherwise, the thresholds T1 and T2 are controlled to use both the interpolation in the field and the compensation between the fields (step S49) as shown in FIG. 5b or 5c.

If the input frame is a B frame, the flow of the processing goes on to step S50 to calculate the distribution of the forward/reverse directional motion vector and extracting the number NB of macro blocks not using motion compensation. A judgement is formed as to whether or not the calculated distributions of the forward and reverse directional motion vector are below predetermined values C2 and C3 respectively, and whether or not the number NB of macro blocks is below a predetermined value N2 (step S51).

If one of the values C2, C3, or N2 fails to meet the condition, the thresholds T1 and T2 are controlled to use only the interpolation in the field only (step S54) as shown in FIG. 5a. If the calculated values are all below the predetermined values C2, C3 and N2, respectively, a judgement is formed as to whether the macro block is a macro block using motion compensation in order to extract the characteristic of each macro block (step S52).

If the outcome of the judgement formed in step S52 indicates that the macro block is not a macro block using motion compensation, the thresholds T1 and T2 are controlled to use only the interpolation in the field (step S54) as shown in FIG. 5a. If the macro block is a macro block using motion compensation, a judgement is formed as to whether or not the forward directional motion vector is 0 (step S53).

If the forward directional motion vector is 0, the thresholds T1 and T2 are controlled to use only the compensation between the fields (step S55) as shown in FIG. 5d. Otherwise, the thresholds T1 and T2 are controlled to use both the interpolation in the field and the compensation between the fields (step S56) as shown in FIG. bc or 5c.

As described above, the threshold determining section 312 determines thresholds T1 and T2. However, the threshold determining section 312 not only determines the thresholds, but optimizes the thresholds T1 and T2 to the characteristic of the picture. Accordingly, the thresholds T1 and T2 are continuously varied by fields. Also, the parameters C1, C2, C3, N1, N2 are set according the system requirements during implementation.

Subsequently, the pixels are positioned according to the type of the picture as illustrated in FIGS. 6a to 6f. The reason that the positions of pixels A to H are not fixed in carrying out a deinterlacing operation based on the type of the frame is described as follows. First of all, for purpose of enhancing the efficiency of the encoding operation, the MPEG does not perform the coding operation in the same order of the frames input. The orders of the frames to be input, coded and displayed based on the type of the frames are listed in Table 1 below.

TABLE 1

| Type of Frame | I | B | P | B | P | B | P | B | P | ... |
|---|---|---|---|---|---|---|---|---|---|---|
| input order | 1 | 2 | 3 | 4 | 5 | 6 | 7 | 8 | 9 | ... |
| coding order | 1 | 3 | 2 | 5 | 4 | 7 | 6 | 9 | 8 | ... |
| displaying order | 1 | 2 | 3 | 4 | 5 | 6 | 7 | 8 | 9 | ... |

In general, the time period required for displaying each frame in the MPEG decoder is varied depending on the type of the frame. Thus, while the I or P frame is being decoded, the previous I or P frame is displayed. The B frame is displayed as it is decoded.

Since the pixel values are deinterlaced in the order of the MPEG decoding, the usable frame varies according to the frame in the deinterlacing operation and the positions of the pixels also change. In other words, the pixels A to H and the position of the pixel C used for the compensation between the fields also changes based on the type of the frame. This is to minimize the use of memories by enabling a decoding operation only with a frame memory of the MPEG decoder.

Motion detection $E_{new}$ is performed for every unoccupied pixels by use of pixels appropriately selected based on the type of the frame. The calculation of the motion detection $E_{new}$ is represented by the following equation.

$$E_{new}=|(D+E)/2-(A+B)/2|$$

Thereafter, the value $E_{new}$ is compared with the thresholds T1 and T2 to determine the weight ( ) for the interpolation in the field and the weight (1− ) for the compensation between the fields.

Figure 6A:
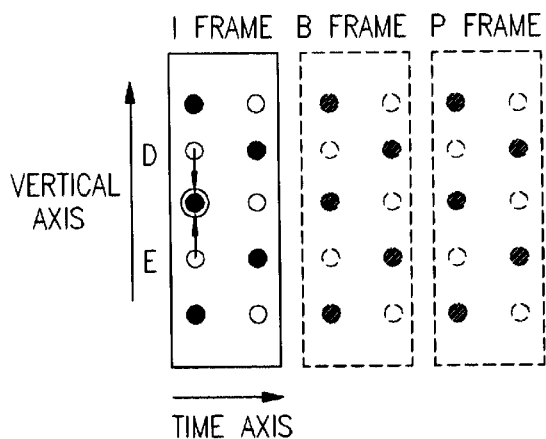
FIGS. 6a to 6f are diagrams positioning pixels A to E based on the type of the frame according to the present invention.
Figure 6B:
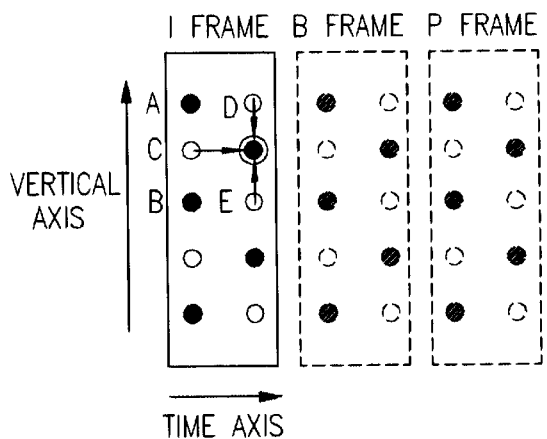
Figure 6C:
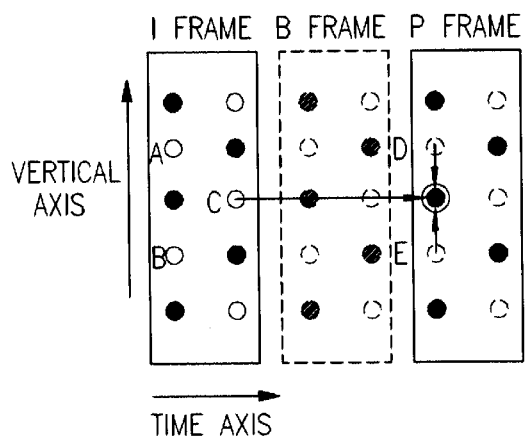
Figure 6D:
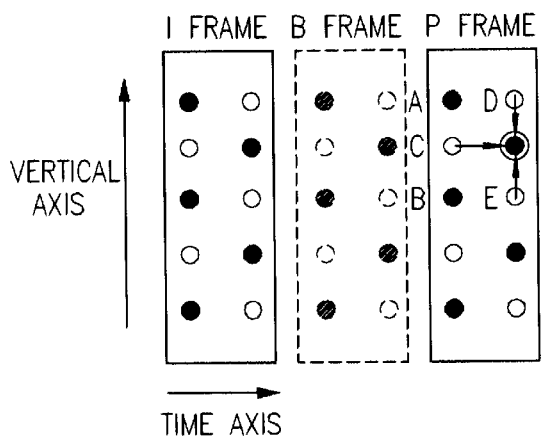
Figure 6E:
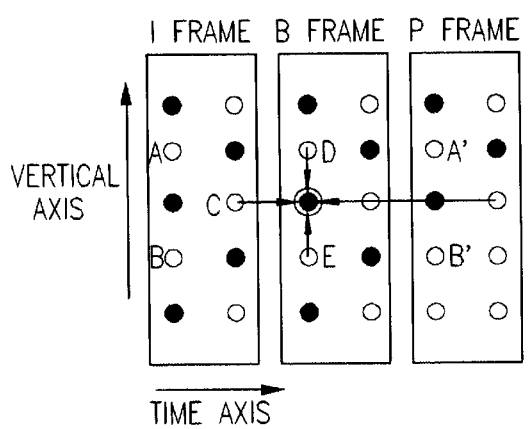
Figure 6F:
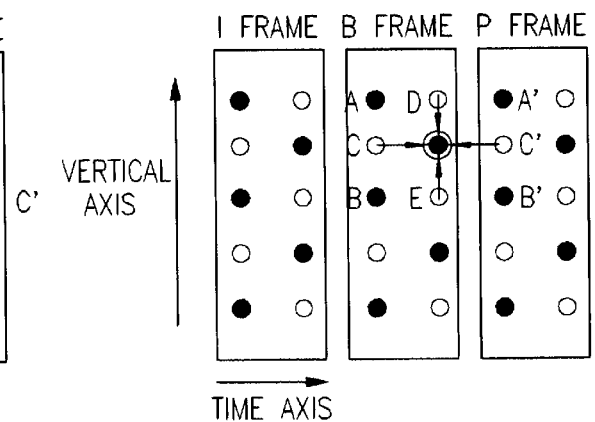
Figure 7A:
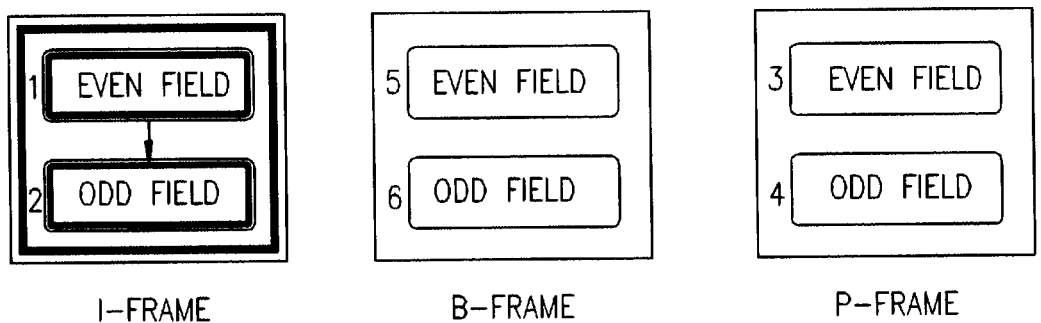
FIGS. 7a to 7c are diagrams illustrating a code processing based on the order of input frame in according to the present invention.
Figure 7B:
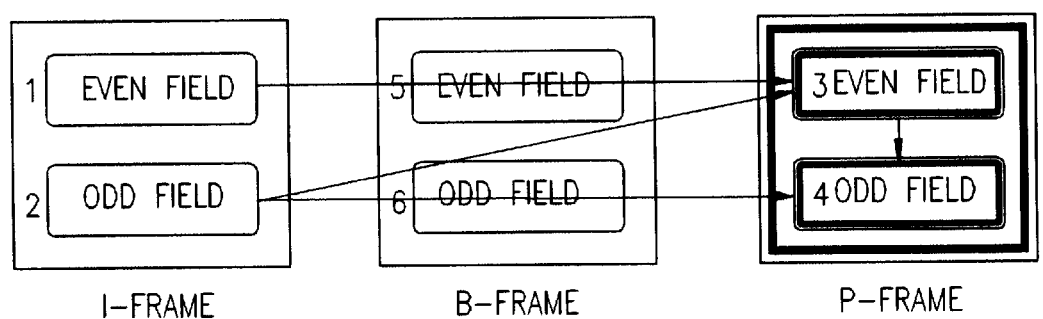
Figure 7C:
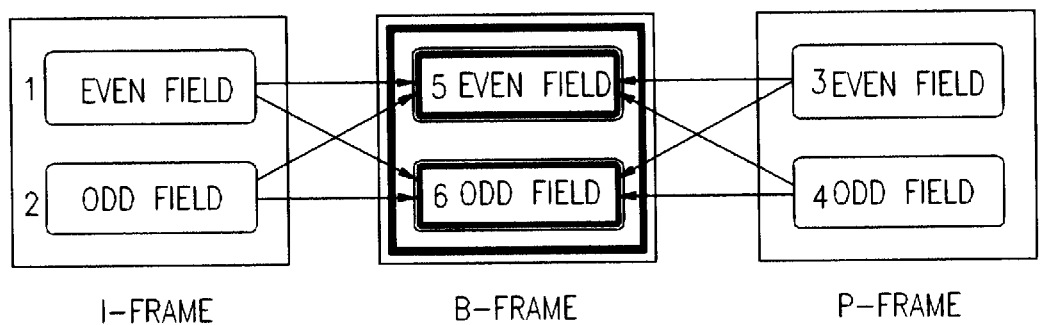

FIGS. 6a to 6f are diagrams for positioning the pixels A to E used for the interpolation based on the type of the frame according to the present invention. FIGS. 7a to 7c are diagrams illustrating a coding processing based on the order of frames input according to the present invention. The first field of the I frame is coded as shown in FIG. 6a, the second field of the I frame is coded as shown in FIG. 6b, the third field of the P frame is coded as shown in FIG. 6c, the fourth field of the P frame is coded as shown in FIG. 6d, the fifth field of the B frame is coded as shown in FIG. 6e, and the sixth field of the B frame is coded as shown in FIG. 6f.

The I and P frames are deinterlaced using only the forward directional motion vector as shown in FIGS. 7a and 7b, while the B frame is deinterlaced together with the I and P frames because of the directional motion compensation, i.e. the forward and reverse directional motion vectors can be used in decoding the B frame as shown in FIG. 7c. For the B frame, the forward/reverse directional compensation between the fields are performed with reference to the type of each macro block.

Referring to FIGS. 6a to 6b, the value of the omitted pixel is calculated with the weights for the interpolation in the field and the compensation between the fields as follows.

$((D+E)/2)^* + C^*(1-)$ for I and P frames $((D+E)/2)^* + C^*(1-)$ for the forward directional interpolation of B frame, $((D+E)/2)^* + C'^*(1-)$ for the reverse directional interpolation of B frame $((D+E)/2)^* + ((C+C')/2)^*(1-)$ for the bidirectional interpolation of B frame.

Figure 8:
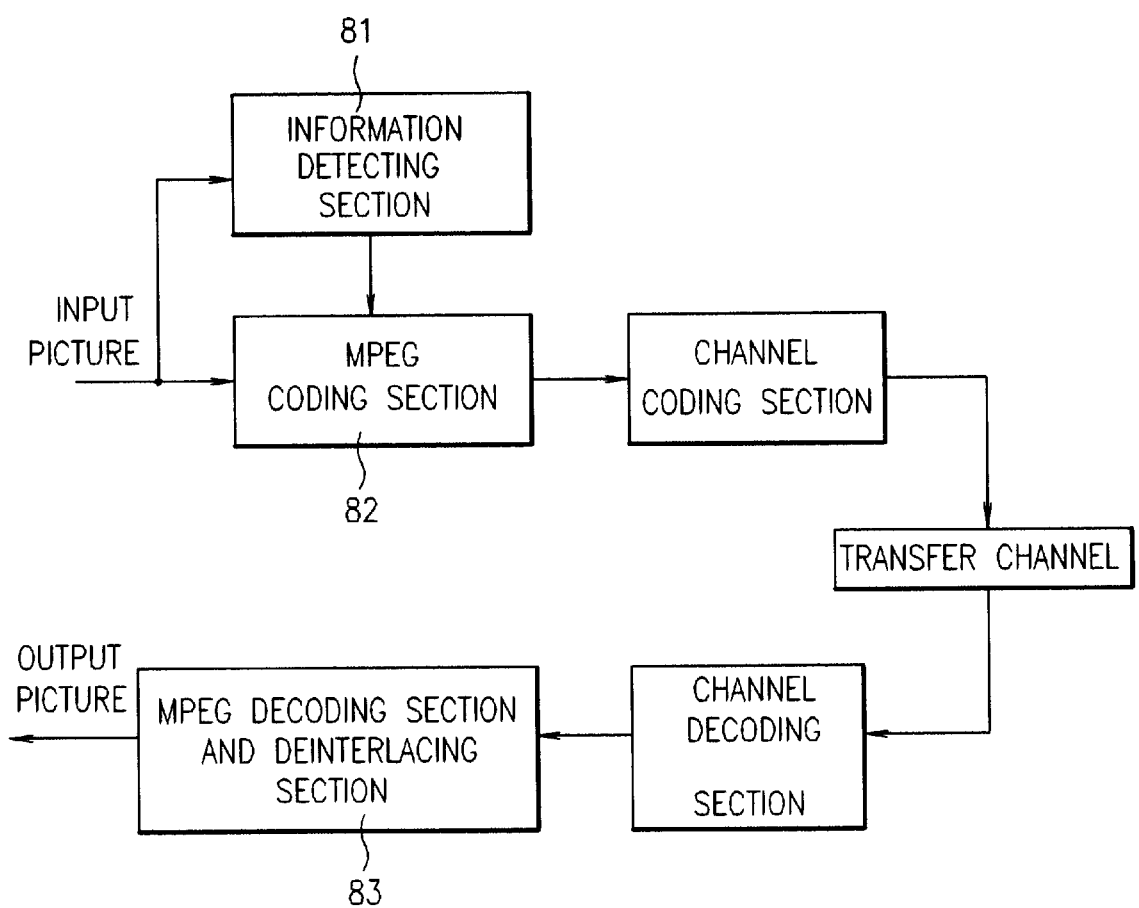
FIG. 8 is a block diagram illustrating the construction of a MPEG coding and decoding system in consideration of deinterlacing apparatus and method according to the present invention.

FIG. 8 is a block diagram illustrating the construction of the MPEG coding and decoding systems according to the present invention, in which the deinterlacing in the MPEG decoding system is taken into consideration. With the addition of an information detecting section 81 outputting the information of each macro block concerning the picture to an MPEG coding section 82 performing the MPEG coding operation, the MPEG decoding and deinterlacing in section 83 can be achieved more effectively.

As discussed above, the picture format converting apparatus and method in a digital TV according to the present invention is applicable to equipments, such as digital TV receiver, Personal Computer-TV, CD-ROM, DVD player, satellite broadcasting receiver, cable broadcasting receiver, digital video reproducer. Also, the picture format converting apparatus and method provide a picture of considerably high quality scanned in the progressive scanning pattern by extracting the characteristics of the picture from the compressed stream without additional hardware in receiving/reproducing a picture scanned in the interlaced scanning pattern coded in the compressed form and transferred/stored in the MPEG or similar way.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for converting a picture form at comprising:
   a picture characteristic extracting section, which classifies input pictures into frame types of first, second and third types, and analyzes and extracts characteristics of each input picture according to full frame based characteristics and individual macro block characteristics;
   an interpolation determining section to determine interpolation operation variables using the characteristics extracted by the picture characteristic extracting section; and
   an operation performing section to convert the picture format by performing an interpolation according to the interpolation operation variables determined by the interpolation determining section, wherein
   for the first type, the picture format is converted based only on interpolation in field; and
   for the second and third types, the picture format is converted (a) based only on the interpolation in field, not based on motion estimation using motion vector, when a first condition is satisfied, (b) based only on the compensation in fields when a second condition is satisfied, and (c) based on both interpolation in field and compensation of fields when a third condition is satisfied.

2. An apparatus of claim 1, wherein the picture characteristic extracting section analyzes and extracts the characteristic of each picture by analyzing a compressed bit stream of every input picture scanned in an interlaced scanning.

3. An apparatus of claim 2, wherein the interpolation determining section determines the interpolation operation variables using the information extracted from every given pictures by the picture characteristic extracting section.

4. The apparatus of claim 2, wherein the picture characteristic extracting section comprises:
   a decoding section decoding the compressed bit stream of the input picture scanned in the interlaced scanning pattern to extract the individual characteristics of macro blocks of each frame and the full characteristic of each frame.

5. The apparatus of claim 4, wherein the picture characteristic extracting section further comprises:
   a threshold determining section determining thresholds using the characteristics extracted by the decoding section.

6. The apparatus of claim 5, wherein the decoding section is a MPEG decoding section.

7. The apparatus of claim 5, wherein the decoding section classifies the input picture as a I frame corresponding to the first type, P frame corresponding to the second type, or B frame corresponding to the third type and decodes the picture according to the type of the frame.

8. The apparatus of claim 7, wherein the operation performing section performs forward and reverse directional compensation between the fields if the type of each macro block is B frame.

9. The apparatus of claim 5, wherein the interpolation determining section comprises:
   a motion detecting section positioning the pixel required for a motion detection based on the type of the input picture and detecting the motion; and
   a comparison section comparing the motion detected by the motion detecting section and the thresholds determined by the threshold determining section to determine a weight for the compensation between the fields and a weight for the interpolation in the field.

10. The apparatus of claim 5, wherein the performance of the decoding section is taken into consideration in the estimation of the motion vector or the determination of the type of the macro block during the coding operation.

11. A method for converting a picture format comprising:
    classifying input pictures into frame types of first, second and third types;

analyzing and extracting from a compressed bit stream of every input pictures scanned in an interlaced scanning pattern the characteristics of each picture according to full frame based characteristics and individual macro block characteristics;

determining interpolation operation variables using the characteristic information extracted; and converting a picture format by performing an interpolation according to the determined interpolation operation variables, wherein for the first type, converting the picture format based only on interpolation in field; and for the second and third types, converting the picture format (a) based only on the interpolation in field, not based on motion estimation using motion vector, when a first condition is satisfied, (b) based only on the compensation in fields when a second condition is satisfied, and (c) based on both interpolation in field and compensation in fields when a third condition is satisfied.

12. The method of claim 11, wherein analyzing the characteristic of the picture comprises:

extracting a coding type of each macro block, a forward/reverse directional motion vector, and a DCT coefficient of the original or differential picture;

comparing the number of intra-coded blocks with the number of blocks coded through motion compensation; and extracting the degree of motion from the correlation between the size information of the motion vectors of each macro block and the motion vectors of the adjacent blocks.

13. The method of claim 11, wherein analyzing and extracting the characteristic of the picture comprises:

decoding the compressed bit stream of the input picture scanned in the interlaced scanning pattern to extract the individual characteristics of macro blocks of each frame and the full characteristic of each frame; and determining thresholds using the characteristics extracted by the decoding section.

14. The method of claim 13, wherein the step of decoding further comprising:

classifying the picture as a I frame corresponding to the first type, a P frame corresponding to the second type, or a B frame corresponding to the third type; and decoding the picture based on the type of the frame.

15. The method of claim 14, wherein analyzing the characteristic of the picture comprises the step of controlling the thresholds to use only an interpolation in the field if the frame is an I frame.

16. The method of claim 14, wherein if the frame is a B or P frame, analyzing the characteristic of the picture comprises the steps of:

calculating the distribution of the motion vectors;

extracting the number of macro blocks not using motion compensation;

forming a judgement as to whether or not the calculated distribution of the motion vectors and the number of macro blocks not using motion compensation meet a predetermined condition and controlling the thresholds to use only the interpolation in the field if the predetermined condition is not met;

forming a judgement as to whether or not the macro block used the motion compensation and controlling the thresholds to use only the interpolation in the field if macro block did not use the motion compensation;

forming a judgement as to whether or not the motion vector is 0; and controlling the thresholds to use only the compensation between the fields if the motion vector is 0 and controlling the thresholds to use both the interpolation in the field and the compensation between the fields if the motion vector is not.

17. The method of claim 16, wherein if the frame is a B frame, the distribution of the forward/reverse directional motion vectors is calculated.

18. The method of claim 12, wherein if the frame is a B frame, the thresholds are controlled according to the outcome of the judgement as to whether or not the forward directional motion vector is 0.

19. The method as defined in claim 11, wherein determining the interpolation operation processing comprises:

positioning the pixels for motion detection based on the type of the picture; and detecting the motion by using the positioned pixels to determine the weights for interpolation in the field and compensation between the fields.

20. The apparatus of claim 1, wherein the first, second and third types are I frame, P frame and B frame, respectively.

21. The method of claim 11, wherein the first, second and third types are I frame, P frame and B frame, respectively.

* * * * *